Feb. 24, 1959 W. P. SCHMITTER 2,874,582
VARIABLE SPEED TRANSMISSION
Filed May 27, 1955 2 Sheets-Sheet 2

INVENTOR.
Walter P. Schmitter
BY
Attorney

United States Patent Office 2,874,582
Patented Feb. 24, 1959

2,874,582
VARIABLE SPEED TRANSMISSION

Walter P. Schmitter, Wauwatosa, Wis., assignor to The Falk Corporation, Milwaukee, Wis., a corporation of Wisconsin Application May 27, 1955, Serial No. 511,589

3 Claims. (Cl. 74—230.17)

This invention relates to variable speed drives.

More particularly, the invention has to do with a type of drive unit involving a gear set belt driven from a motor carried thereby and wherein a variable pitch pulley is utilized to regulate the output speed of the unit.

One object of the present invention is to simplify and otherwise improve the construction and operation of drives of this type.

Another object is to provide improved means for effecting a relative adjustment between the variable pitch pulley and the belting for speed change purposes.

Another is to provide improved means for adjusting the motor relative to the gear set in a manner to utilize the speed changing properties of the variable pitch pulley.

Other objects and advantages will appear, expressed or implied, from the following description of a variable speed drive embodying the present invention.

In the accompanying drawings:

Fig. 5 is an enlarged perspective view of the ring guide shown in Fig. 4.

Figure 1:
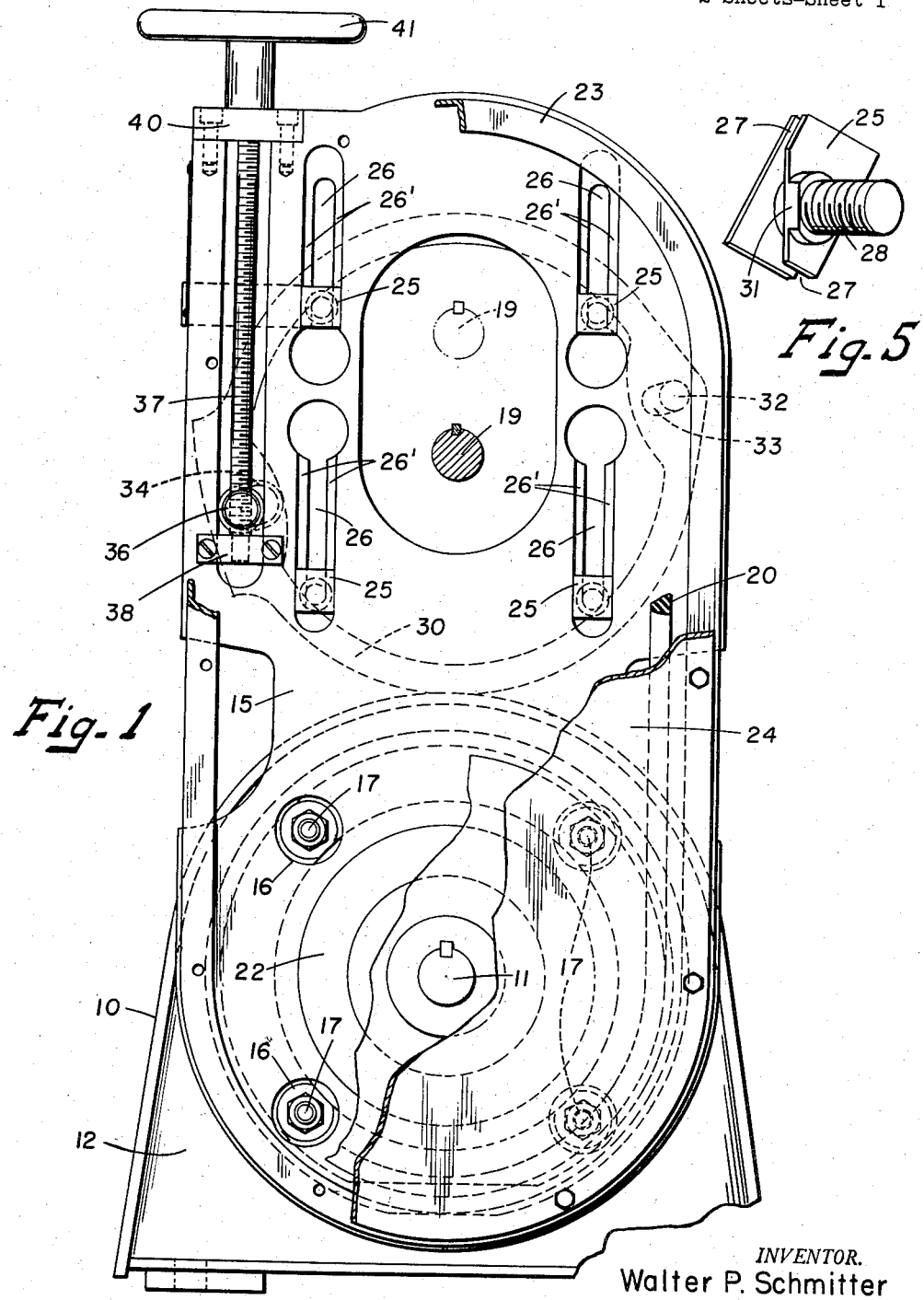
Figure 1 is an end view of a variable speed drive constructed in accordance with the present invention with parts broken away for the sake of clearness.

The variable speed drive selected for illustration includes a speed reducer 10, such as fully disclosed in my prior Patent No. 2,596,794, having an input shaft 11 projecting through an end wall 12 of a housing 13, and an output shaft (not shown) projecting through and from the other end of the housing and connected to the input shaft 11 through a set of gears contained in the housing.

The speed reducer 10 provides support for a driving motor 14 and for this purpose an elongated plate 15 is provided suitably attached at one end to the end wall 12 of the speed reducer. In this instance the plate 15 is shown equipped with a set of four equally spaced mount-lugs 16 adapted to be secured to the face of the end wall 12 by screws 17 threaded into the wall at points equally spaced about the axis of the shaft 11. The motor 14 is carried by a suitable bracket 18 adjustably fixed to the projecting end of the plate 15. The arrangement is such that the plate 15 may be attached to the wall 12 in any of several positions about the shaft 11, so as to position the motor 14 above the speed reducer, as shown, or at either side thereof as desired.

In all positions of the plate 15 the motor 14 is disposed with its shaft 19 parallel to and spaced from the shaft 11. Both shafts 11 and 19 extend through the plate 15 and are connected by one or more V-belts 20 trained about pulleys 21 and 22 respectively fixed to the projecting ends of the shafts. The pulleys 21 and 22 and belting are preferably enclosed by a suitable housing which in this instance comprises a peripheral wall 23 of sheet metal welded to the plate 15 and a cover 24 removably attached to the wall 23.

One of the pulleys, preferably the driving pulley 21, is a variable pitch pulley of a well-known type in which at least one of the conical flanges 21' thereof is automatically movable axially toward and from the other flange to vary the width of the pulley groove and to thus maintain driving engagement with the belt 20 during variations in the center distance between pulleys. That is to say, as one of the pulleys, such as pulley 21, is moved toward the other pulley, the pulley flange 21' moves toward the other flange to cause the belt 20 to recede from the pulley axis so as to increase the effective pitch of the pulley; and when the pulley 21 is moved from the other pulley, the belt 20 reacts to force flange 21' away from the other flange so as to permit the belt to advance toward the pulley axis and thus decrease the effective pitch of the pulley. Since pulleys of this type are well-known in the art a further description thereof is deemed unnecessary.

Figures 2, 3, 4:
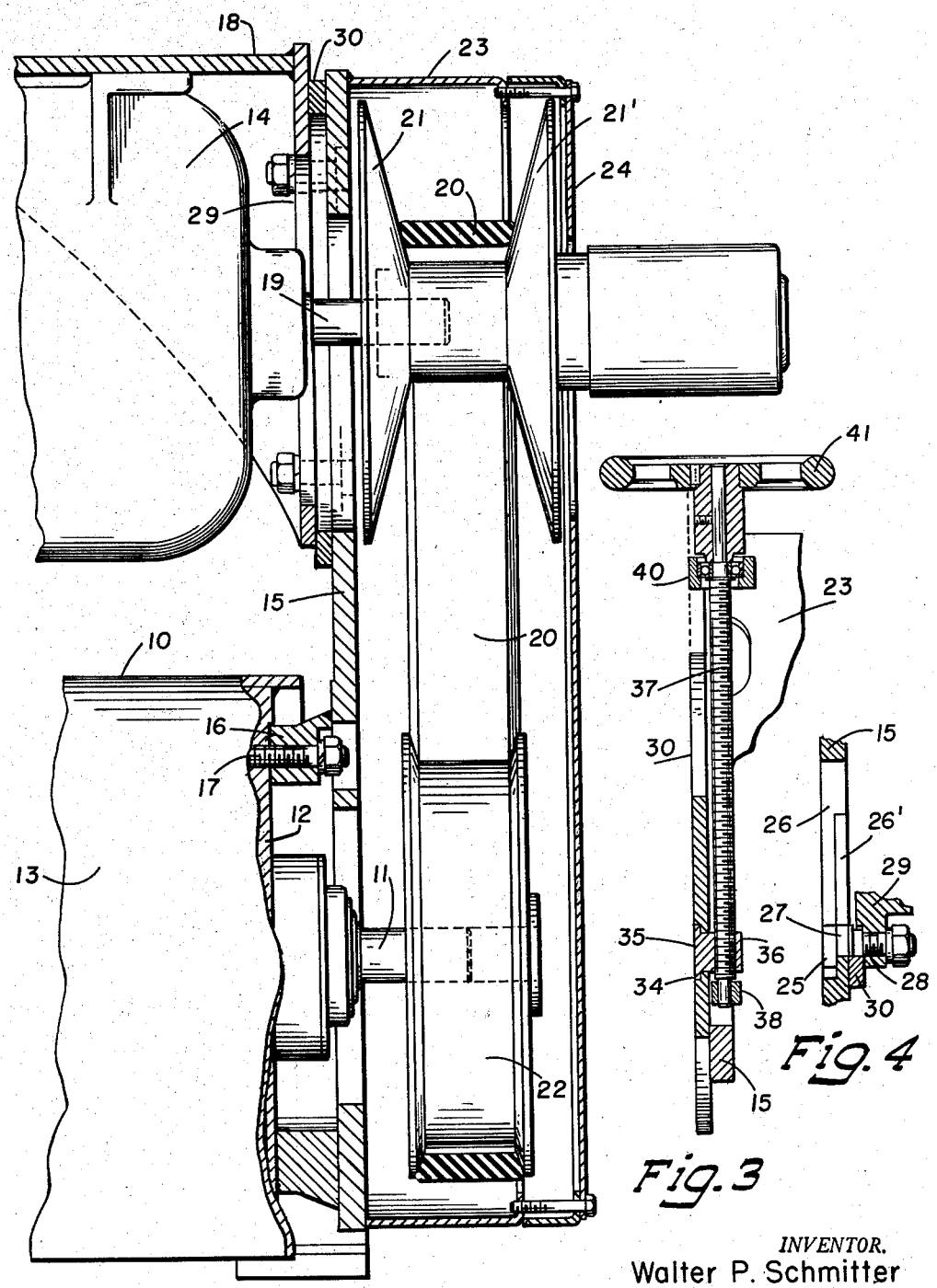
Fig. 2 is a side elevation, partly in section.
Fig. 3 is a sectional view of the regulating mechanism shown in elevation in Fig. 1.
Fig. 4 is a fragmentary sectional view of one of the four ring guides, and associated parts, shown in elevation in Fig. 1.

In this instance the pulley 21 is rendered adjustable toward and from the pulley 22 by mounting the motor 14 and its supporting bracket 18 for adjustment lengthwise of the plate 15. Although such motor adjustment might be accomplished in various ways the adjustable mounting means now to be described has important advantages. For this purpose a set of shoes 25, preferably four, are provided individually guided in longitudinal slots 26 formed in the plate 15, each slot having a pair of internal guide flanges 26' engaged in grooves 27 formed in the sides of the contained shoe. As shown particularly in Figs. 4 and 5, each shoe 25 is equipped with an integral supporting stud 28 by which it is rigidly fixed to the supporting leg 29 of the motor bracket 18. The leg 29 is in the form of a flat plate and the several studs 28 are fixed thereto in a symmetrical relation equally spaced about the motor shaft 19. A ring 30 interposed between the plate 29 of the motor bracket and the plate 15 coacts with the shoes 25 to determine the position of the shoes within the slots 26.

In this instance the ring 30 is rotatably seated on the face of the bracket plate 29 and is permanently centered with respect thereto by the several shoe-and-stud elements 25—28. For this purpose the ring 30 encircles these elements and is in close sliding engagement with an arcuate face 31 each of which is curved to match the internal face of the ring. The ring 30 is also slidably seated on the face of the plate 15, and a fixed stud 32 projecting from the plate 15 coacts with a short slot 33 in the ring to provide a supporting fulcrum therefor. The slot 33 is disposed diametrically of the ring and at a diametrically opposite point in the ring a second slot 34 is provided adapted to slidably receive a flanged boss 35 on a suitable nut 36. The nut 36 is threaded on an actuating screw 37 carried by the plate 15 in parallel relation with the guide slots 26 therein. In this instance the plate 15 is shown longitudinally slotted to accommodate the screw 37, the screw being journalled at its lower end in a suitable bracket 38 at the base of the slot 39 and at its upper end in a block 40 bridging the upper end of the slot. The screw 37 is actuated and controlled by any appropriate means such as a hand wheel 41 fixed to the upper end thereof.

From the foregoing it will be understood that by suitable manipulation of the screw 37 the nut 36 may be actuated to swing the ring 30 about the fulcrum stud 32, and that during such actuation the ring 30 reacts on the several shoe-and-stud elements 25—28 to adjust the latter along the guide slots 26 so as to adjust the motor 14 and the pulley 21 lengthwise of the plate 15. The motor and pulley 21 may thus be adjusted to any desired position within a range indicated by the lower and upper limiting positions of the motor shaft 19 shown in Fig. 1. It will be further understood that in the upper limiting position of the motor and pulley 21, shown in Fig. 2, the belt 20 engages the pulley 21 at a minimum radius, so that the effective pitch of the pulley is at a minimum causing operation of the speed reducer at minimum speed; and that by lowering the motor and pulley 21 the effective pitch of the pulley 21 may be increased to increase the operating speed of the speed reducer.

Various changes may be made in the invention hereinabove specifically described without departing from or sacrificing the advantages of the invention as defined in the appended claims.

I claim:

1. In a variable speed drive including a housed gear set, a driving motor, driving connections between said motor and gear set including a variable pitch pulley responsive to adjustment of said motor relative to said gear set for varying the rate of operation of the gear set; means for adjusting said motor toward and from said gear set comprising a motor support projecting from the housed gear set, a motor bracket, means guiding said bracket for adjustment thereof relative to said support, a ring fulcrumed on said support and reacting on said guide means to determine the position of said bracket relative to said support, and means for actuating said ring to adjust said bracket relative to said support.

2. In a variable speed drive including a housed gear set, a driving motor, driving connections between said motor and gear set including a variable pitch pulley responsive to adjustment of said motor relative to said gear set for varying the rate of operation of the gear set; means for adjusting said motor toward and from said gear set comprising a motor support projecting from the housed gear set, a motor bracket, a set of elements projecting from said bracket and individually guided in said support, a ring centered by said elements and reacting thereon and on said support to determine the position of said bracket relative to said support, and means for actuating said ring to adjust said bracket relative to said support.

3. In a variable speed drive including a housed gear set, a driving motor, driving connections between said motor and gear set including a variable pitch pulley responsive to adjustment of said motor relative to said gear set for varying the rate of operation of the gear set; means for adjusting said motor toward and from said gear set comprising a motor support projecting from the housed gear set, a motor bracket, a set of elements projecting from said bracket, each of said elements including a shoe guided for movement relative to said support, a ring centered by said elements and fulcrumed on said support for determining the position of said bracket on said support, and means for actuating said ring to adjust said bracket relative to said support.

References Cited in the file of this patent

UNITED STATES PATENTS

| | | |
|---|---|---|
| 2,259,657 | Johnson | Oct. 21, 1941 |
| 2,302,812 | Stempel | Nov. 24, 1942 |
| 2,382,935 | Armitage | Aug. 14, 1945 |
| 2,471,120 | Pepin | May 24, 1949 |
| 2,619,842 | Felix | Dec. 2, 1952 |
| 2,732,731 | Schmitter | Jan. 31, 1956 |